J. W. RESH.
PLANT PROTECTOR.
APPLICATION FILED APR. 22, 1914.
1,113,485. Patented Oct. 13, 1914.
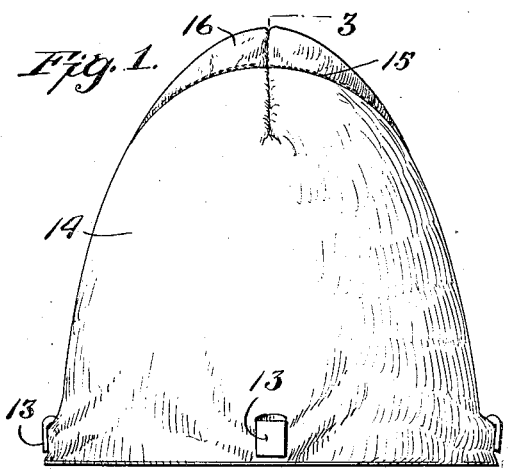
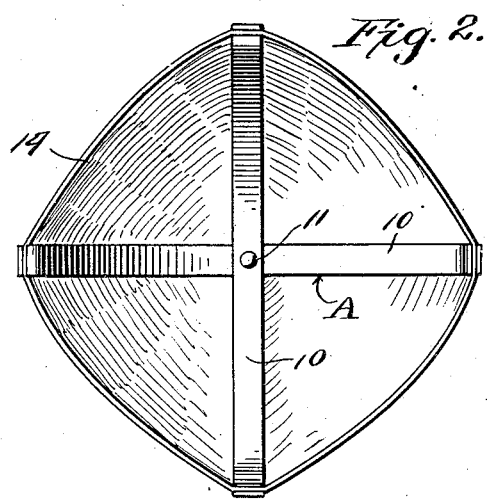
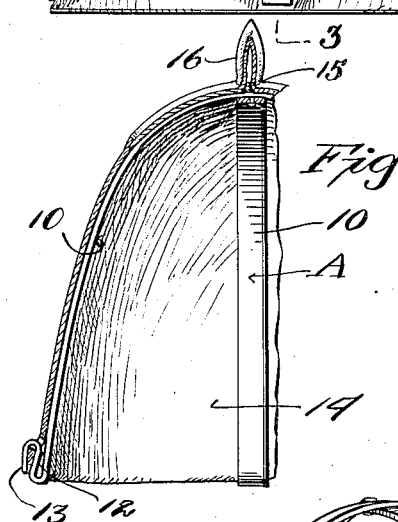
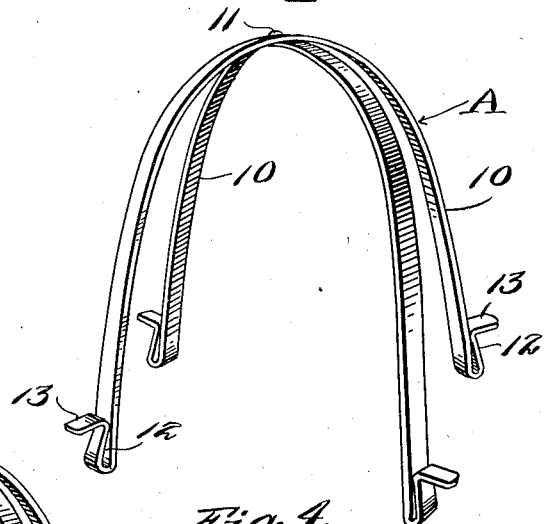
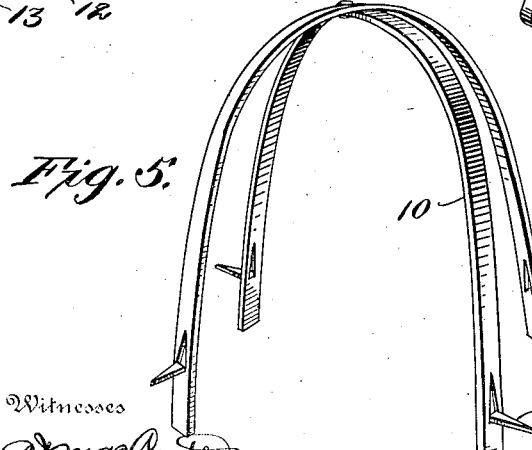
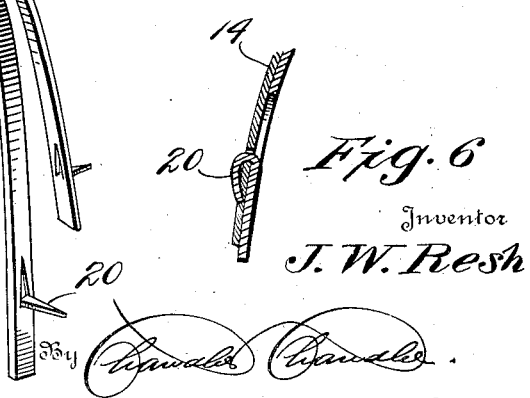
Inventor
J. W. Resh

UNITED STATES PATENT OFFICE.

JOHN W. RESH, OF ST. HENRY, OHIO.

PLANT-PROTECTOR.

1,113,485.  Specification of Letters Patent.  Patented Oct. 13, 1914.

Application filed April 22, 1914. Serial No. 833,715.

*To all whom it may concern:*

Be it known that I, JOHN W. RESH, a citizen of the United States, residing at St. Henry, in the county of Mercer, State of Ohio, have invented certain new and useful Improvements in Plant-Protectors; and I do hereby declare the following to be a full, clear, and exact description of the invention, such as will enable others skilled in the art to which it appertains to make and use the same.

This invention relates to plant protectors.

The object of the invention resides in the provision of an exceedingly simple device which can be placed over a plant to protect same against frost and the like.

A further object of the invention resides in the provision of a device of the character named which can be manufactured at an exceedingly small cost and which is so constructed that said devices can be stored one within the other whereby they will occupy a very small space when not in use.

With the above and other objects in view the invention consists in the details of construction and in the arrangement and combination of parts to be hereinafter more fully described and particularly pointed out in the appended claims.

In describing the invention in detail reference will be had to the accompanying drawings wherein like characters of reference denote corresponding parts in the several views, and in which—

Figure 1 is a view in elevation of a plant protecting device constructed in accordance with the invention; Fig. 2, a bottom view of the device; Fig. 3, a section on the line 3—3 of Fig. 1; Fig. 4, a perspective view of the frame of the device; Fig. 5, a perspective view of the frame of a modified form of the device, and Fig. 6, a section showing the method of securing the hood to the frame in the modified form.

Referring to the drawings the improved plant protector is shown as comprising a frame A formed of a plurality of inverted U-shaped members 10 connected together at their arm connecting portions by suitable fastening means 11. The free ends of the arms of the members 10 are bent outwardly and inwardly as at 12 and then directed outwardly as at 13. The frame A is covered by a fabric hood 14, the outwardly directed portion 13 of the members 10 being passed through the hood and clenched thereon. The top of the hood 14 is gathered and stitched along the line 15 to form a gripping extension 16 whereby the device may be carefully placed upon and removed from a plant.

It will be noted that the frame A has substantially a bee hive shape which will permit of the protectors being placed one within the other when not in use so as to occupy a very small space.

In the modified form of the invention illustrated in Figs. 5 and 6 the members 10 have struck therefrom tongues 20 which are substantially V-shaped and are engaged through the hood 14 and clenched as shown in Fig. 6.

What is claimed is:—

1. A plant protector comprising a frame formed of a plurality of inverted U-shaped members connected together at their arm connecting portions, the free ends of the arms of each member being bent outwardly and inwardly and then directly outwardly, and a fabric hood engaged over said members, the outwardly directed ends of the arms of the members being passed through the hood and clenched.

2. A plant protector comprising a plurality of inverted U-shaped members connected together at their arm connecting portions, and a fabric hood secured over said members, said hood having its top portion gathered and stitched to form a gripping projection.

In testimony whereof, I affix my signature, in the presence of two witnesses.

JOHN W. RESH.

Witnesses:
E. J. SCHMITZ,
JACOB STEIN.